United States Patent [19]

Martin

[11] Patent Number: 5,523,039
[45] Date of Patent: Jun. 4, 1996

[54] PROCESS FOR STIFFENING HATS

[75] Inventor: James W. Martin, Blairstown, N.J.

[73] Assignee: Mantrose Haueser Company, Westport, Conn.

[21] Appl. No.: 237,671

[22] Filed: May 4, 1994

[51] Int. Cl.$^6$ ................................................ B29C 70/12
[52] U.S. Cl. ...................... 264/136; 2/175.9; 264/331.18
[58] Field of Search .......................... 2/175.9, 192, 193, 2/194; 264/331.18, 187, 134, 135, 136, 137, 257, 304, 305, 308

[56] References Cited

U.S. PATENT DOCUMENTS

| | | | |
|---|---|---|---|
| 686,674 | 11/1901 | Keator | 2/175.9 |
| 2,616,091 | 11/1952 | Luttge | 2/192 |
| 3,249,667 | 5/1966 | Gregory et al. | 264/119 |
| 3,673,611 | 7/1972 | Cain et al. | 2/192 |
| 4,140,836 | 2/1979 | Wallace | 428/463 |
| 4,909,915 | 3/1990 | Bederke et al. | 204/181.4 |
| 5,302,459 | 4/1994 | Kim et al. | 264/134 |
| 5,326,516 | 7/1994 | Brannon | 264/257 |

FOREIGN PATENT DOCUMENTS

| | | | |
|---|---|---|---|
| 457813 | 7/1949 | Canada | 2/175.9 |
| 3278 | 3/1916 | United Kingdom | 2/175.9 |
| 845162 | 8/1960 | United Kingdom | 2/175.9 |

*Primary Examiner*—Jay H. Woo
*Assistant Examiner*—Robert B. Davis
*Attorney, Agent, or Firm*—Calfee, Halter & Griswold

[57] ABSTRACT

In the manufacture of hats, the shellac stiffening agent typically used for imparting extra stiffness to the final hat product is replaced with an aqueous acrylic or acrylic/styrene emulsion or dispersion having a pH of 4 to 7, the acrylic or methacrylic polymer or copolymer in the emulsion having an acid value of 80 to 120 mg KOH/gm and a glass transition temperature of 17° to 35° C.

14 Claims, No Drawings

PROCESS FOR STIFFENING HATS

BACKGROUND OF THE INVENTION

The present invention relates to a technique for stiffening hats, particularly wool felt hats, and to compositions therefor.

In the manufacture of hats, particularly felt hats made from wool and/or fur, it is customary to add a stiffening agent to the material forming the hat to give the ultimate hat product appropriate stiffness as well as water resistance. In the past, a number of different naturally occurring resins have been used for this purpose. For example, animal glue, gelatin, tragacanth, shellac and various natural gums such as gum arabic have been used. Also tried were some oils such as linseed oil. Of these materials, shellac seems to exhibit the best combination of properties, and accordingly shellac has been the material of choice for the last 125 years.

In a typical hat-manufacturing process, clean wool fibers are first defatted by treatment with ethylene chloride, chloroform, or any solvent that will remove grease and oils, and then assembled into a web or batt of predetermined thickness. The batt is then washed with hot water to shrink and interlock the fibers (felting) and thereby provide some mechanical stability to the hat body.

Next, the batt is dyed or otherwise processed to develop the desired color. Inasmuch as wool is naturally acidic in nature, acidic dyes are typically used for this purpose. In the case of white hats, optical brighteners and in some instances small amounts of blueing are also added. Typically, the dyeing, brightening and/or other coloring operation is accomplished at a pH of about 2.5 to 3.5, the target being approximately pH 3.0.

Once the coloring operation is complete, the felted body is impregnated with a stiffening agent. In the case of shellac, this is usually done with the shellac being in the form of aqueous emulsion. Although shellac is readily soluble in alcohol, it is preferable to avoid organic solvents in the hat-stiffening process for safety reasons. Moreover, although shellac is also soluble in highly alkaline water, highly alkaline conditions would adversely affect the chemistry of the dyes, etc. used in the acidic coloring process. Therefore, alkaline conditions (pH above 7) also are typically avoided. Accordingly, it is conventional to employ shellac emulsified in water using borax (sodium borate) and/or sodium perborate as the emulsifier agent as this will provide an impregnating composition which is essentially free of alcohol or other organic solvent and also exhibits an essentially neutral pH, i.e., about pH 6.4 to 6.8, only slightly on the acidic side.

After impregnation, the body is worked into the desired shape and stiffened. Usually, this is done by first forming the body into the desired shape on a suitable mold and then subjecting the so formed body to heat and pressure to "set" the stiffening agent therein and thereby fix the shape of the hat permanently into the body. Permanently fixing the shape of the body into the desired shape by heat and pressure is known in the art as "blocking" or "proofing" and is typically done two or three times in most hat forming processes. As a result, a precursor hat product having substantially the desired size and shape is typically produced.

In order to produce a final hat product, the hat precursor produced as described above is typically trimmed to size and then subjected to "beating," i.e., vigorous working to make the product more supple. Finally, the beaten product may be subjected to a final stiffening step with heat and pressure, if desired. Depending on the desired appearance of the final product, the so-formed hat may also be subjected to "pouncing," i.e., sanding to remove external long fibers.

Shellac has been the material of choice for hat stiffening for the last 125 years because it exhibits the right combination of properties. When dispersed in aqueous phase, it shows good wetting properties and hence good affinity to wool and fur fibers during impregnation. In addition, it flows easily during repeated blocking steps after precipitation with the acid in the body and thereby is easy to use in the hat molding/shaping operation. It also exhibits a suitable amount of adhesiveness and flexibility and thereby provides the appropriate amount of stiffness to the final hat product. It is compatible with acidic dye systems so that it can be used with conventional dyes without difficulty, and finally it also exhibits low odor and is therefore not unpleasant to use.

However, shellac is a naturally-occurring product. As a result, it is normally subject to significant variations in both price and availability.

For this reason, efforts have continued over the last 50 years to find a substitute for shellac to avoid these difficulties. Significant work has been centered on replacing shellac with synthetic resins such as polyvinyl acetate, polyvinyl alcohols, polyvinyl chloride and the like. However, to date, a suitable replacement for shellac has not yet been found.

Accordingly, it is an object of the present invention to provide a new composition for use in stiffening hats, particularly felt and fur hats, which exhibits the same excellent combination of properties as shellac but which is based on synthetic resin instead of naturally occurring substances.

SUMMARY OF THE INVENTION

This and other objects are accomplished by the present invention which is based on the discovery that excellent hat-stiffening compositions can be made from aqueous synthetic resin emulsions or dispersions provided that the synthetic resin used therein (a) is thermoplastic, (b) exhibits an acid value of 50 to 150 mg KOH/gm, (c) exhibits a Precipitation Index of 2 to 20, and (d) exhibits a glass transition temperature of 10° to 80° C. and further provided that the pH of the aqueous emulsion or dispersion is between 4 and 7.

DETAILED DESCRIPTION

In accordance with the present invention, hats are stiffened by impregnation of a web or body of hat material with an aqueous stiffening composition having a particular combination of properties and thereafter heating the impregnated material to set or cure the stiffening agent.

The stiffening compositions used in accordance with the present invention are aqueous systems having a neutral to slightly acidic pH, e.g., 4 to 7, and containing polymers having a particular combination of properties. By "aqueous system" is meant a solution, emulsion or dispersion in which water is the continuous phase and in which the synthetic polymer resin constitutes the dissolved, dispersed or emulsified phase.

These aqueous systems can tolerate as much as 30 weight percent of a water-soluble co-solvent such as an alcohol, ketone, etc., in accordance with the present invention. However, it is desirable to avoid co-solvents in amounts greater than 10%, preferably 5%, and it is most preferred to avoid organic co-solvents altogether, for safety reasons.

The synthetic resin used in forming the stiffening compositions of the present invention (hereinafter "synthetic stiffening resin") can be any synthetic thermoplastic polymer which exhibits an acid value of 50 to 150 mg KOH/gm and a glass transition temperature, $T_g$, of 10° to 80° C. Preferred synthetic stiffening resins are those thermoplastic polymers having an acid value of 65 to 135 mg KOH/gm and glass transition temperature, $T_g$, of 15° to 40° C. Most preferred are those having an acid value of 70 to 120 mg KOH/gm and glass transition temperatures, $T_g$, of 17°0 to 35° C. Measurement of the acid value can be conveniently carried out in accordance with ASTM-D 1639.06.01, while measurement of the glass transition temperature can be done by ASTM-D2354(06.02).

In current hat-manufacturing processes, two and usually three stiffening steps are employed. In each stiffening step, the shellac stiffening agent is heated usually with steam to cause at least partial melting and refreezing thereof. In accordance with the present invention, at least insofar as practiced on felt hats, the synthetic resin employed should exhibit sufficient thermoplasticity so that it can be at least partially melted in a first stiffening step as conventionally practiced using steam as the heat source, and if desired, remelted in subsequent hat-shaping and forming steps also using steam as the heat source.

In this regard, an important feature of the present invention is that the synthetic resin stiffening composition of the present invention can be used in conventional hat-manufacturing processes with little or no modification. This enables the compositions of the present invention to be substituted for the shellac stiffening compositions currently used with little or no difficulty. Accordingly, it is desirable in accordance with the present invention that the specific synthetic stiffening resins employed be selected so that their properties of thermoplasticity, acid value and glass transition temperature mimic the particular type or grade of shellac used previously in a particular operation as close as possible.

In this connection, in conventional hat-stiffening processes in which the hat is formed from wool-felt or fur and the stiffening agent is shellac, a unique interaction occurs between the stiffening agent particles and the fibers of the felt or fur during the heating (i.e., the blocking or proofing) operations. Before heating is begun, the precipitated shellac particles are typically distributed substantially uniformly throughout the body of the fibrous hat body. When heat is applied, which is usually done through the surfaces of the mold on which the body is mounted for shaping, the individual shellac particles tend to migrate from the surfaces of the body to its interior where they at least partially melt and agglomerate as a result of the heating operation. Although not wishing to be bound any theory, it is believed this is due to the relative chemistries of the fibers and the shellac particles, in particular, the relatively acidic nature of the wool fibers as compared to the shellac particles. In any event, in these systems, it has been found that as a result of the heating operation, the shellac impregnant preferentially locates towards the center of the fibrous body, with the outer surfaces of the fibrous body being relatively free of the shellac particles. As a result of this phenomenon, a natural "feel" is imparted to the hat surface.

In accordance with the present invention, this same effect is realized, which is believed to be due at least in part to the fact that the synthetic stiffening resins employed have an acid value of 50 to 150, preferably 80 to 120, mg KOH/gm. In other words, suitable selection of the acid value is an important feature of the present invention which promotes good affinity of the synthetic stiffening resin to the wool fibers of the body. This, in turn, enables these synthetic resins to mimic shellac in terms of its precipitation properties and migrating effect during proofing.

Another important aspect of the synthetic resins employed by the present invention is their glass transition temperatures. Since the synthetic stiffening resins of the present invention work by melting, their glass transition temperatures must be low enough to allow melting in a reasonable time by the heat source conventionally used in most hat-making processes, i.e., steam. Also, the glass transition temperature cannot be so low that the stiffening effect provided by the synthetic stiffening resin would be lost at ambient temperatures as, for example, by melting. In accordance with the present invention, these requirements are satisfied by selecting resins whose glass transition temperatures are between about 10° and 80° C., preferably 15° to 40° C., most preferably between 17°0 and 35° C.

Still another important feature of the synthetic resins employed by the present invention is their Precipitation Index. In conventional hat manufacturing processes, the acidity left from the dying process of the wool or fur bodies is sufficient to cause precipitation of the dispersed shellac particles. In fact shellac has a Precipitation Index of approximately 4. Accordingly, it is desirable in accordance with the present invention that the synthetic thermoplastic resins employed also exhibit a Precipitation Index such that they mimic shellac in terms of its ability to precipitate out in response to the acid in the wool or fur bodies to be processed.

By "Precipitation Index" is meant the number of milliliters of a 1 weight percent aqueous sulfuric acid solution that cause precipitation of the polymer from 50 milliliters of an aqueous system containing the polymer in a solids concentration of 5 weight percent. The Precipitation Index for a particular polymer can easily be determined by diluting a sample of the polymer in aqueous composition until the solids concentration is 5% by weight and then titrating 50 milliliters of the composition so obtained with a 1% by weight aqueous solution of sulfuric acid. The volume of sulfuric acid solution, in milliliters, necessary to cause precipitation of the polymer solids is the Precipitation Index.

In accordance with the invention, particularly when the fibers being processed are wool or fur, it is preferred that the particular polymers employed exhibit a Precipitation Index on the order of that of shellac. Accordingly, it is preferred that the polymers have a Precipitation Index of about 2 to 10, more preferably 2 to 6, most preferably about 4. However, where other means are used to cause polymer precipitation, for example by adding externally supplied acid, the Precipitation Index need not be so exactly chosen.

Still another important variable of the synthetic thermoplastic resins used in accordance with the present invention is molecular weight. As well appreciated by those skilled in the art of polymer chemistry, molecular weight is related to glass transition temperature. In any event, it is also preferred in accordance with the present invention that the molecular weight of the thermoplastic polymers selected for use as the synthetic stiffening resins have a molecular weight of 200,000 or less. More preferably, the thermoplastic polymers should have a molecular weight of about 1,000 to 20,000.

Examples of thermoplastic synthetic polymers which are useful as synthetic stiffening resins in accordance with the present invention are polymers and copolymers (including terpolymers, etc.) of unsaturated organic acids such as acrylic acid, methacrylic acid, crotonic acid, isocrotonic acid, sorbic acid, maleic acid, fumaric acid, and the like, as well as their corresponding salts. Preferred are polymers and copolymers of acrylic acid and methacrylic acid.

As for the copolymers (including terpolymers), any addition-polymerizable comonomer can be included in the copolymer so long as the required properties of the resin as described above are maintained. Examples of suitable comonomers are styrene, butadiene, acrylonitrile, vinyl alcohol, vinyl acetate, vinyl chloride, and the like. Particularly preferred are the $C_1$-$C_8$ esters of the above-noted unsaturated organic acids, particularly the methyl, ethyl, isopropyl and 2-ethylhexyl esters of acrylic acid and methacrylic acid. Of course, since these resins must ultimately be thermoplastic as well as having the indicated acid value and glass transition temperature, the type and amount of monomers and comonomers incorporated therein must be selected so that the product polymer has these properties.

Specific example of polymers useful in a synthetic stiffening resins in accordance with the present invention are polymers based on ethyl acrylate/acrylic acid/methyl methacrylate, butyl acrylate/acrylic acid/methyl methacrylate, ethyl acrylate/acrylic acid/methacrylic acid/methyl methacrylate, ethyl acrylate/acrylic acid/methyl methacrylate/styrene, butyl acrylate/acrylic acid/styrene, and acrylic acid/styrene.

The particle size of the synthetic stiffening resins of the present invention is not critical. As well appreciated by those skilled in the art, particle size and particle size distribution play important roles in long-term stability of polymer emulsions. To this end, the particle size and particle size distribution of the polymer particles in the inventive stiffening system should be suitable for fostering long-term stability. However, it is contemplated that not all of the synthetic stiffening systems of the present invention will exhibit long-term stability and that it may be necessary in some instances to mechanically mix these systems in use to keep the synthetic stiffening resin particles sufficiently dispersed, particularly if they are diluted after being received from the manufacturer. It is preferable, however, that particle size and particle size distributions be selected to foster long term stability, as this facilitates use.

Also, the particular size of the emulsified or dispersed polymers must not be so great that, as a practical matter, little or no polymer penetrates into the bat body during impregnation. This, of course, depends among other things on the relative size of the openings between adjacent fibers and varies depending on the type of fibers and the degree of compaction to which the fibers have been subjected. Determining whether or not the particle size of a particular polymer composition is too large can easily be done by routine experimentation simply by attempting to make a hat with a proposed polymer composition and seeing if enough polymer deposits on the fibers.

The concentration of synthetic stiffening resin in the liquid in bath used for impregnation is not critical. Any concentration can be used so long as there is enough resin in the composition to deposit the desired amount of solids on the web or body in a reasonable period of time. Of course, the composition should not be so concentrated in resin that it becomes difficult or impossible to impregnate uniformly as is conventionally done. In general, it is desirable that the concentration of synthetic stiffening resin in the impregnating composition, during impregnation, be maintained at 5 to 30, preferably 10 to 25, percent by weight.

The amount of synthetic stiffening resin impregnated into a fibrous body or matrix in accordance with the present invention is not critical. In typical prior art processes in which shellac is employed as the stiffening agent in the manufacture of wool-felt hats, 5 to 30, preferably 10 to 25, weight percent stiffening agent, based on the weight of the final product, is normally employed. The same or similar amounts of synthetic stiffening resin can also be employed in accordance with the present invention, although any suitable amount, as desired, can be employed.

In this connection, the conditions of impregnation, including physical method of applying the impregnant, resin concentration, time of impregnation, amount of resin deposited, etc., as used in prior art processes in which shellac is the stiffening agent, are well appreciated by those skilled in the art of hat manufacture. The synthetic stiffening systems of the present invention work in essentially the same way as the shellac systems of the prior art and accordingly those skilled in the art will have no difficulty in choosing particular conditions of impregnation for a particular application when using the inventive stiffening systems.

In accordance with another feature of the present invention, other conventional processing agents can also be employed in combination with the synthetic polymer stiffening system of the present invention. For example, in some conventional processes, a non-ionic, high density polyethylene wax or other material is often included in the stiffening composition as a lubricating agent. This provides the hat product with enough slip (lubrication) so that it can be pounced (sanded) without clogging the sandpaper and also provides enough lubricity so that the sewing needles will not heat up and break during the subsequent sewing step. Other known agents such as styrene-acrylic copolymer emulsions of particularly fine particle size have also been added for improving stiffening and optical properties. Silicone resins have also been added as mold release agents and also to provide waterproofing, while other types of mold release agents have also been employed. Any of these agents can also be included in the stiffening compositions of the present invention.

A particularly preferred processing agent for use in the present invention are various polymers and copolymers, especially styrene/acrylic copolymers, containing entrapped air in the form of microvoids. These polymers and copolymers are known in the art as microvoid polymers. Examples of such microvoid polymers are Ropaque OP-6210 Emulsion from Rohm and Haas Company. Because air is entrapped in the emulsified polymer particles, the polymer is white and opaque. When these polymers are added to the stiffening solutions used to make white hats, a whiter hat product is produced and moreover most if not all flaws therein are eliminated.

A particular advantage of the present invention is in the production of white hats from wool felt. Because shellac is inherently dark in color, manufacture of white felt hats when using shellac as the stiffening agent is particularly difficult. Any shellac particles which do not migrate to the interior of the body during the heating/stiffening steps tend to form dark, unsightly marks or splotches on the felt surfaces as a result of the heating operation. This, in turn, makes the product unacceptable, thereby producing a reject. In accordance with the present invention, many synthetic resins, particularly the acrylic and methacrylic copolymer resins described above, are essentially colorless in nature. Accordingly, when these are used, dark marks or splotches from the heating operation can be avoided even if all of the polymer particles fail to migrate to the interior of the fibrous body during the heating operation. This can significantly reduce the incidence of rejects in the manufacturing process.

As a result of the present invention, conventional technology for stiffening hats during hat manufacture is improved by replacing the shellac conventionally used as the stiffening agent with a synthetic stiffening polymer having a particular combination of properties. As a result of this combination of properties, these stiffening polymers exhibit good wetting properties and good affinity to the fibers and thereby mimic the operation of shellac particles in terms of their ability to migrate towards, and to conglomerate in, the center of fibrous bodies during the hat forming operation. In addition, because of their thermoplasticity and appropriate glass transition temperatures, they provide the desirable stiffness and flexibility to the final hat product, while being useful in conventional hat-manufacturing processes without major changes in operation or equipment. Furthermore, because they are usually colorless, they can be used on white hats without adding dark unsightly marks thereto and can be also used on colored hats without interfering with the true colors thereof. Being synthetic, they also involve less odor than naturally-occurring shellac. Moreover, using synthetic stiffening resins in accordance with the present invention surprisingly also produces final hat products which, surprisingly, require significantly less sanding (pouncing) than when shellac is employed.

WORKING EXAMPLE

In order to more thoroughly illustrate the present invention, the following working examples are provided. In each example, a 5 ounce fibrous body of wool fibers was impregnated with a specific hat stiffening composition comprising an aqueous dispersion of a synthetic thermoplastic resin at 5 Bé. Impregnation was accomplished by standard roller procedure and as a result, 5 to 10% thermoplastic resin solids were impregnated into the bodies. Each body was then subjected to a conventional blocking procedure by subjecting the hat to conventional hat forms operating at 175° C. to 200° C. and 75 psi with the addition of steam. After the first forming step, the hats were subject to beating to give the hat a soft shape. In the next step, the hats were again stiffened with heat and steam at 75 psi.

After blocking, each hat was removed from its mold and subject to pouncing by rubbing with a 100 to 200 grade sandpaper by a standard hat sanding machine.

Each finished hat product was then tested for stiffness by a comparative method. In particular, each hat which was as stiff as a hat made with shellac was judged to be a success, while each hat that was softer was judged to be unacceptable.

The compositions of the different stiffening agents tested as well as the results obtained are set forth in the following Table 1.

TABLE 1

| Ex. | Thermoplastic Polymer Resin | Solids (Wt. %) | pH | Molec. Weight | Tg° C. | Acid Value | Success |
|---|---|---|---|---|---|---|---|
| 1 | Styrene/acrylic | 48 | 8.2 | >200,000 | 98° | 82 | No |
| 2 | Styrene/acrylic | 45 | 8.2 | >200,000 | 27° | 52 | No |
| 3 | Styrene/acrylic | 42 | 9.0 | >200,000 | 27° | 52 | No |
| 4 | Shellac/styrene | 50 | 8.5 | >200,000 | 91° | 21 | No |
| 5 | Acrylic | 60 | 6.0 | 12,000 | 25° | 80 | Yes |
| 6 | Acrylic | 30 | 6.3 | 45,000 | 17° | 120 | No |
| 7 | Polyvinyl acetate/ alcohol (Resin 1251- National Starch) | 50 | 4.8 | — | 19° | 0 | No |
| 8 | Polyvinyl acetate (Fulatex PD-62 Fuller Co.) | 50 | 4.2 | — | 37° | 0 | No |

From the foregoing, it can be seen that only those thermoplastic synthetic resin aqueous dispersions which exhibit the appropriate combinations of pH, glass transition temperature and acid value function to provide the desired hat stiffening properties of the invention.

A further series of experiments were done to illustrate a technique for screening particular thermoplastic resins to determine if they would be useful as synthetic stiffening agents in accordance with the present invention. In this technique, the Precipitation Index of the candidate polymer was determined in the manner described above by titrating 50 milliliters of 5% solids composition of each polymer with a 1% sulfuric acid solution. The results obtained are set forth in the attached Table 2.

TABLE 2

| Ex. | Thermoplastic Polymer Resin | pH | Molec. Weight | Tg° C. | Acid Value | Precip. Index (ml acid 1% $H_2SO_4$) | Stiffen Hate? |
|---|---|---|---|---|---|---|---|
| 9  | Shellac | 6.6 | 1,000 | 35° | 84 | 4.0 | Yes |
| 10 | Styrene/acrylic | 8.2 | 200,000 | 98° | 82 | 15.0 | No |
| 11 | Styrene/acrylic | 8.2 | 200,000 | 27° | 52 | 14.0 | No |
| 12 | Styrene/acrylic | 9.0 | 200,000 | 27° | 52 | 16.0 | No |
| 13 | Styrene/acrylic | 8.5 | 200,000 | 91° | 21 | 20.0 | No |
| 14 | Acrylic | 6.0 | 12,000 | 25° | 80 | 4.0 | Yes |
| 15 | Acrylic | 6.3 | 45,000 | 17° | 120 | 25.0+ | No |
| 16 | Polyvinylacetate/alcohol (Resin 1251 National Starch) | 4.8 | — | 19° | 0 | 25.0+ | No |
| 17 | Polyvinylacetate (Fulatex PD-62 Fuller Co.) | 4.2 | — | 37° | 0 | 25.0+ | No |
| 18 | Acrylic copolymer (neocryl A-650 ICI resins US) | 6.3 | — | 88° | — | 25.0+ | No |
| 19 | Acrylic (neocryl 6092 Zeneca resins) | 4.2 | — | — | 33 | 25.0+ | No |
| 20 | Acrylic copolymer (neocryl BT-8 Zeneca resins) | 5.0 | — | — | 72 | 25.0+ | No |
| 21 | Acrylic copolymer (Synthemal 97603 Reichhold Chemical) | 6.0 | — | 80° | — | 25.0+ | No |
| 22 | Acrylic (Rhoplex AC1024 Rohm & Haas) | 3.9 | — | — | — | 25.0+ | No |
| 23 | Acrylic (Rhoplex HA16 Rohm & Haas) | 3.0 | — | 72° | — | 25.0+ | No |
| 24 | Acrylic (Acrysol 1098 Rohm & Haas) | 3.5 | 30,000 | 24° | 100 | 25.0+ | No |
| 25 | Acrylic (Johncryl 142 SC Johnson) | — | — | — | — | 25.0+ | No |
| 26 | Acrylic (Johncryl SCX646 SC Johnson) | — | — | — | — | 25.0+ | No |
| 27 | Styrene/acrylic | 8.5 | 15,000 | 34° | 130 | 25.0+ | No |
| 28 | Styrene/acrylic | 8.8 | 8,000 | 95° | 200 | 15.0 | No |
| 29 | Acrylic copolymer (Rhoplex 1835 Rohm & Haas) | 8.5 | — | — | — | 25.0+ | No |
| 30 | Acrylic vinyl-chloride (UCAR acrylic 503 Union Carbide) | 5.0 | — | — | — | 25.0+ | No |

Although only a few embodiments of the present invention have been described above, it should be appreciated that many modifications can be made without departing from the spirit and scope of the invention. For example, although the foregoing description has centered around making hats from wool-felt, the present invention can be employed in the manufacture of hats made from any other fibrous material of animal origin. All such modifications are intended to be included within the scope of the present invention, which is to be limited only by the following claims.

I claim:

1. A process for treating a body or web of fibers to promote stiffening thereof when said body or web is formed into the shape of a hat and heated during manufacture, said process comprising impregnating said body or web with an aqueous system of a synthetic stiffening polymer, said system having a pH of 4 to 7, said synthetic stiffening polymer being thermoplastic and having an acid value of 50 to 150 mg KOH/gm and a glass transition temperature of 10° to 80° C.

2. The process of claim 1 wherein, said synthetic stiffening polymer has an acid value of 80 to 120 mg KOH/gm and a glass transition temperature of 17° to 35° C.

3. The process of claim 2 wherein, said synthetic stiffening polymer is a polymer or copolymer of acrylic acid, methacrylic acid or both.

4. The process of claim 3 wherein, said body or web is made from fibers of animal origin.

5. The process of claim 4 wherein, said body or web is made from wool.

6. The process of claim 1 wherein, said synthetic stiffening polymer has a Precipitation Index of 2 to 10 and a molecular weight of 200,000 or less.

7. The process of claim 6 wherein, said molecular weight is 1,000 to 20,000.

8. In a process for manufacturing hats in which a mat of a material selected from the group consisting of wool fibers and animal fur fibers is formed into the shape of a hat and heated to cause said mat to remain in said shape, the improvement comprising impregnating said mat with a synthetic polymer stiffening system, said system comprising an aqueous emulsion or dispersion of a thermoplastic synthetic polymer having an acid value of 50 to 150 mg KOH/gm and a glass transition temperature of 10° to 80° C., said aqueous emulsion or dispersion also having a pH of 4 to 7.

9. The process of claim 8, wherein said system is an aqueous emulsion or dispersion of a copolymer of acrylic acid, methacrylic acid or both, and further wherein said copolymer has an acid value of 80 to 120 mg KOH/gm and a glass transition temperature of 17°0 to 35° C.

10. The process of claim 9, wherein said mat is composed of a body of wool fibers.

11. A process for forming a hat comprising
   (a) impregnating a fibrous felt body with an aqueous emulsion or dispersion of a synthetic stiffening polymer, said aqueous emulsion or dispersion having a pH of 4 to 7, said synthetic stiffening polymer being thermoplastic and having an acid value of 50 to 150 mg KOH/gm and a glass transition temperature of 10° to 80° C.,
   (b) forming the impregnated fibrous body so made into the shape of a hat, and
   (c) subjecting said impregnated fibrous body to a first heating step for causing said fibrous body to stiffen.

12. The process of claim 11 wherein the synthetic stiffening polymer has a precipitation index of 2–10.

13. A process for treating a body or web of fibers to promote stiffening thereof when said body or web is formed into the shape of a hat and heated during manufacture, said process comprising impregnating said body or web with an aqueous system of a synthetic stiffening polymer, said system having a pH of 4 to 7, said synthetic stiffening polymer being thermoplastic and having a glass transition temperature of 10° to 80° C. and a precipitation index of 2–10.

14. The process of claim 13 wherein the synthetic stiffening polymer has an acid value of 50 to 150 mg KOH/gm.

* * * * *